United States Patent
Tsuiki et al.

[11] Patent Number: 5,984,283
[45] Date of Patent: Nov. 16, 1999

[54] VIBRATION-DAMPING RUBBER IN SUSPENSION OF VEHICLE

[75] Inventors: Tetsuya Tsuiki, Haguri-gun; Katsuya Hadano, Kasugai; Hideyuki Imai, Kani, all of Japan

[73] Assignee: Toyoda Gosei Co., Ltd., Aichi-ken, Japan

[21] Appl. No.: 08/827,502

[22] Filed: Mar. 28, 1997

[30] Foreign Application Priority Data

| Mar. 29, 1996 | [JP] | Japan | 8-103579 |
| Jul. 15, 1996 | [JP] | Japan | 8-205366 |
| Mar. 4, 1997 | [JP] | Japan | 9-067380 |

[51] Int. Cl.⁶ .................................................. F16F 15/08
[52] U.S. Cl. ..................... 267/33; 267/141; 267/153; 267/140.3; 267/286; 267/170
[58] Field of Search ........................ 267/33, 153, 141, 267/140.3, 200, 1.5, 167, 179, 170, 189, 276, 286, 292, 248, 219, 293, 221, 220, 281; 428/465; 174/152 R; 384/125, 907, 297; 524/227, 230; 280/124, 155, 124.142, 124.151, 124.152

[56] References Cited

U.S. PATENT DOCUMENTS

| 3,392,971 | 7/1968 | Herbenar et al. | 267/276 |
| 3,562,291 | 2/1971 | Lutzmann et al. | |
| 4,192,529 | 3/1980 | Shiratori et al. | 267/276 |
| 4,500,666 | 2/1985 | Wada . | |
| 4,673,314 | 6/1987 | Hara et al. | 267/140.3 |
| 4,854,766 | 8/1989 | Hein | 403/225 |
| 4,880,318 | 11/1989 | Shibahara et al. | 384/907 |
| 4,950,719 | 8/1990 | Oyama et al. . | |
| 5,002,829 | 3/1991 | Shibahara . | |
| 5,160,122 | 11/1992 | Balsells | 267/167 |
| 5,203,849 | 4/1993 | Balsells | 267/1.5 |
| 5,224,790 | 7/1993 | Hein | 267/140.3 |
| 5,246,994 | 9/1993 | Shibahara et al. . | |
| 5,275,389 | 1/1994 | Pinch et al. | 267/33 |
| 5,286,014 | 2/1994 | Chakko | 267/141.2 |
| 5,290,018 | 3/1994 | Watanabe et al. | 267/141.3 |
| 5,308,104 | 5/1994 | Charles | 264/220 |
| 5,310,167 | 5/1994 | Noll, Jr. | 267/33 |
| 5,358,224 | 10/1994 | Balsells | 267/33 |
| 5,421,565 | 6/1995 | Harkrader et al. | 367/220 |
| 5,467,970 | 11/1995 | Ratu et al. | 267/220 |
| 5,467,971 | 11/1995 | Hurtubise et al. | 188/322.12 |
| 5,518,819 | 5/1996 | Shibahara et al. | 428/465 |
| 5,565,251 | 10/1996 | Tang et al. | 267/141.2 |
| 5,676,355 | 10/1997 | Hayashi et al. | 267/33 |
| 5,788,262 | 8/1998 | Dazy et al. | 188/321.11 |

FOREIGN PATENT DOCUMENTS

| 63-39011 | 3/1988 | Japan . |
| 63-57310 | 3/1988 | Japan . |

*Primary Examiner*—Douglas C. Butler
*Attorney, Agent, or Firm*—Pillsbury Madison & Sutro LLP

[57] ABSTRACT

A vibration-damping rubber for a suspension of a vehicle is composed of a resilient rubber body adapted to be interposed between a plurality of members of the suspension. The resilient rubber body has a slide surface adapted to contact one of the plurality of members. One part of the resilient rubber body, which includes at least the slide surface, is composed of a rubber having high sliding characteristics.

12 Claims, 7 Drawing Sheets

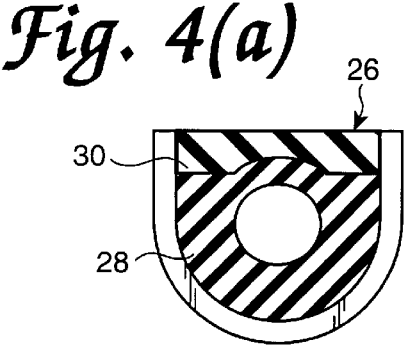
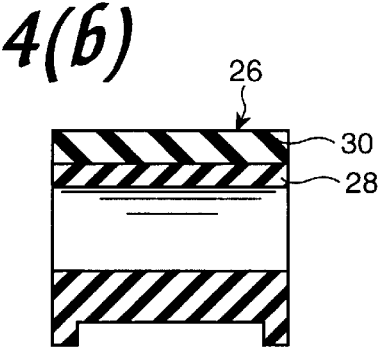
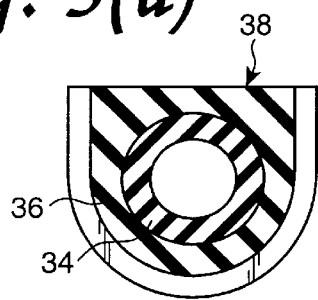
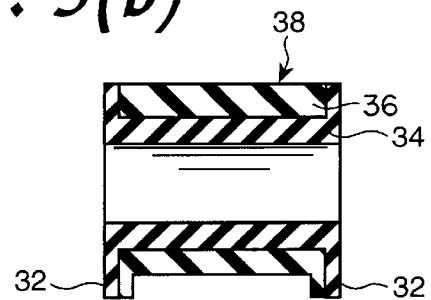
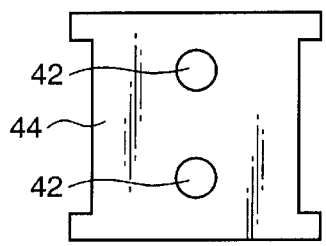
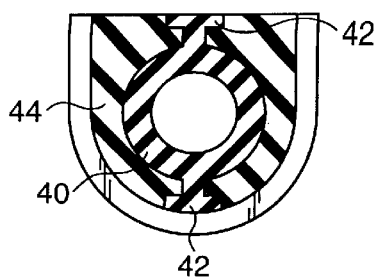
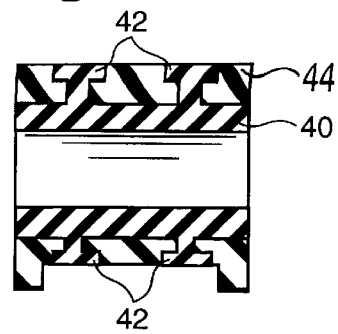

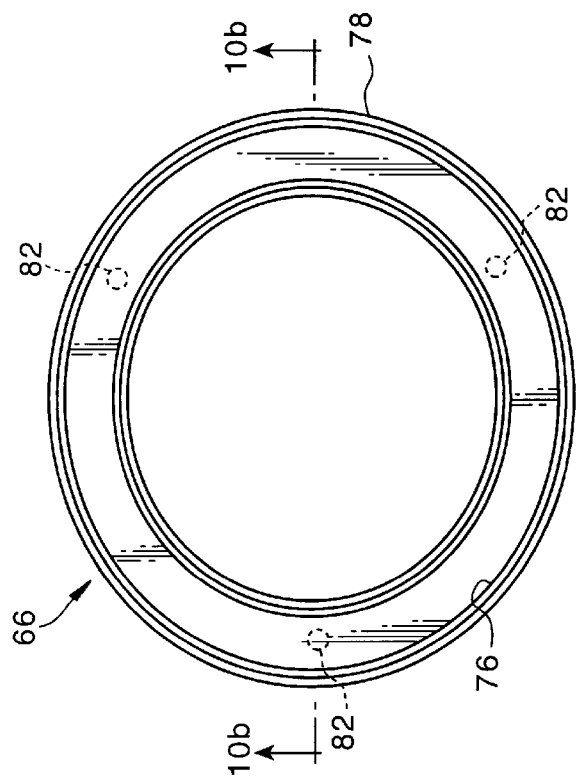
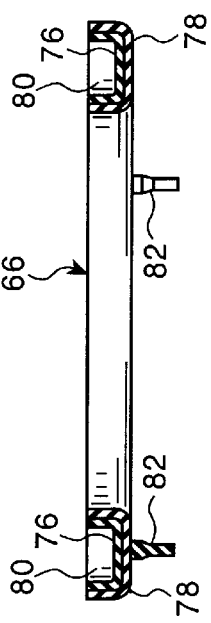
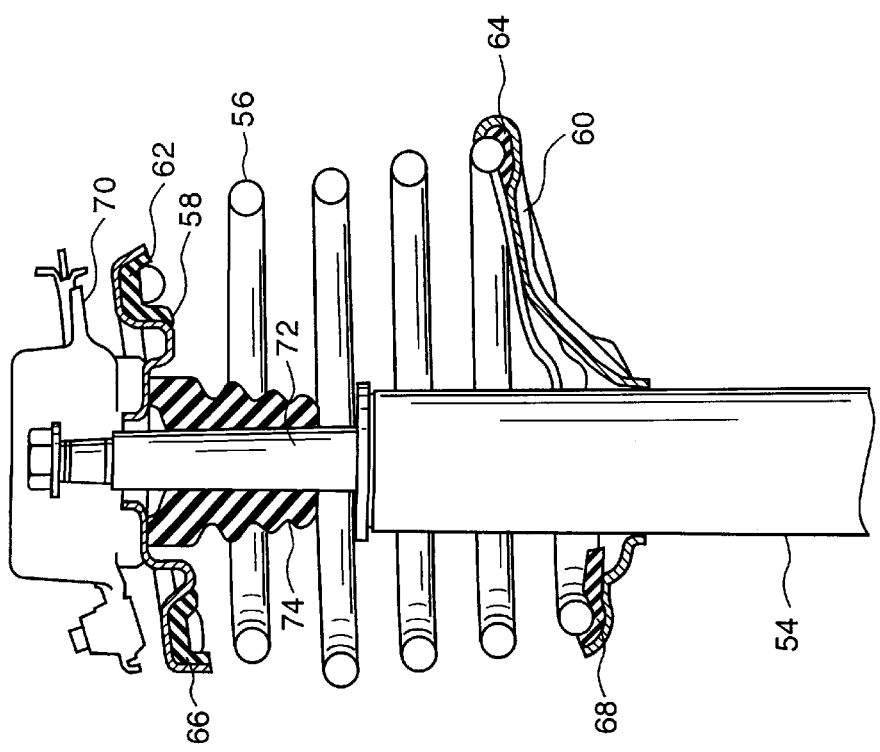

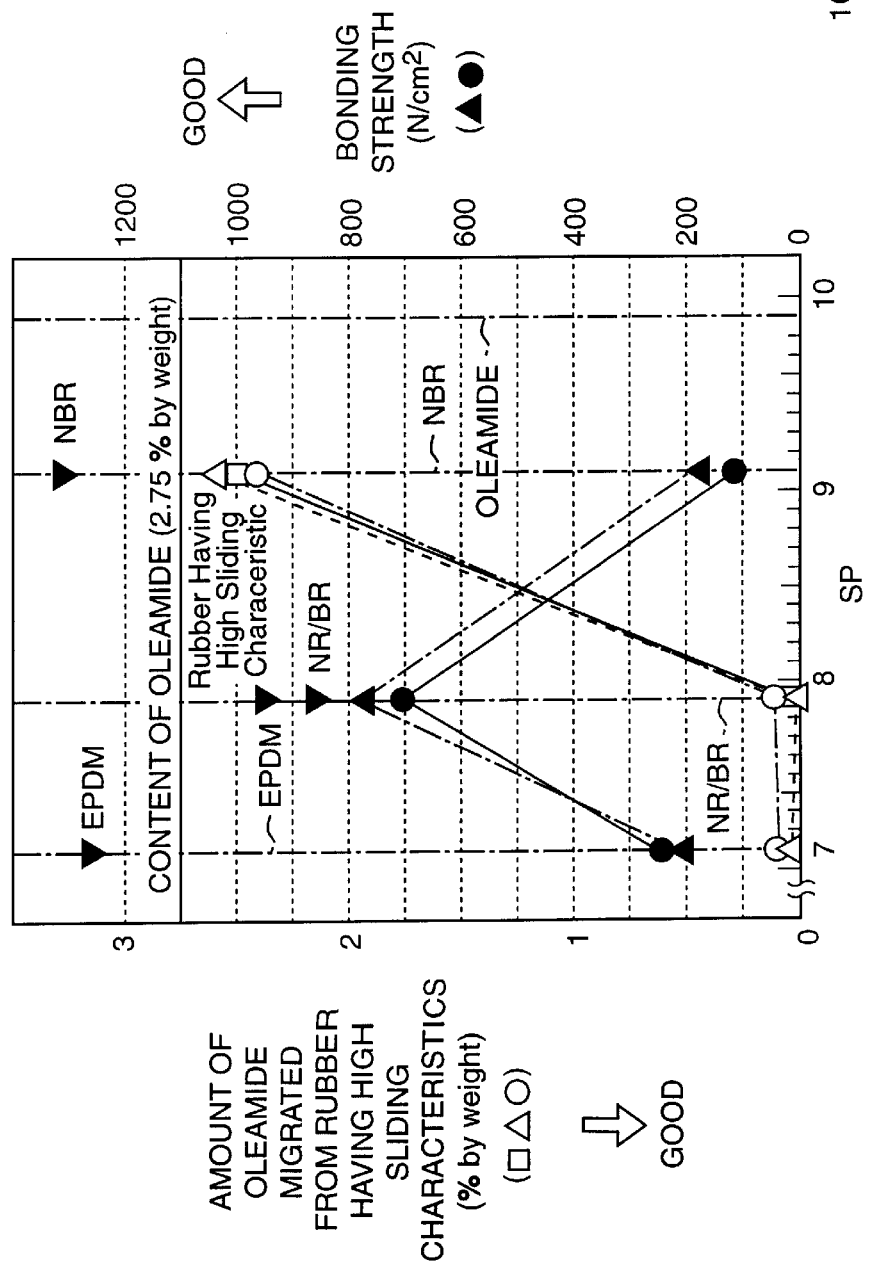
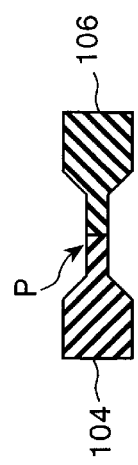
Fig. 14(a)
Fig. 14(b)

VIBRATION-DAMPING RUBBER IN SUSPENSION OF VEHICLE

BACKGROUND OF THE INVENTION

1. Field of the Invention

The present invention relates to a vibration-damping rubber adapted to be used in the suspension of a vehicle, such as a stabilizer bushing for holding a stabilizer bar and coil spring insulator for supporting a coil spring.

2. Description of the Related Art

Examples of the vibration-damping rubber useful for a suspension include a stabilizer bushing for holding a stabilizer bar adapted to be secured to a suspension arm.

As shown in FIG. 1, such a stabilizer bushing is generally composed of a thick-walled cylindrical resilient rubber body 10, in which a stabilizer bar S is adapted to be inserted. The resilient rubber body 10 has a flat top surface and radially projecting flanges 12 formed along or around the end edges thereof. An outer surface of the resilient rubber body 10, which is defined between the flanges 12, is adapted to be retained by a bracket 14 having a generally U-shaped cross-section. The bracket 14 is secured to a vehicle body (not shown) by inserting bolts in attaching holes 16 formed in both end parts thereof.

The resilient rubber body 10 is generally formed of a natural rubber but this, however, can result in a problem that occurs when a vehicle starts or when the working angle of the stabilizer bar S is great, the problem being that the inner surface of the resilient rubber body 10 and stabilizer bar S may displace relative to each other thereby generating noise. To overcome this problem, it has been proposed to compose the resilient rubber body 10 of a rubber having high sliding characteristics, thus reducing the sliding resistance against the stabilizer bar S and restraining the generation of noise. In this arrangement, however, when, as shown in FIG. 2, the resilient rubber body 10 displaces laterally to abut a curved part S1 of the stabilizer bar S, the resilient rubber body 10 may slip laterally relative to the bracket 14 due to a lateral force applied by the stabilizer bar S, which is caused by the coefficient of friction between the resilient rubber body 10 and the bracket 14 or vehicle body being small. To prevent this lateral slippage, it is possible to provide stoppers adjacent to the resilient rubber body 10. This arrangement, however, has problems that both the number of parts and manufacturing costs increase.

On the other hand, another type of stabilizer bushing has been known where a resilient rubber body is provided with a slide surface composed of a resin material in an inner surface thereof (Japanese Utility Model application laid-open No. Sho 63-39011, Japanese Patent application laid-open No. Sho 63-57310, for example). The stabilizer bushing thus arranged, however, has a problem that the overall spring constant increases due to the resin material having a stiffness higher than that of rubber. To reduce the spring constant, the resilient rubber body can be made from a soft material. This arrangement, however, lowers the durability of the material. The slide surface of resin material has another problem that when sand or the like intrudes between the slide surface and the stabilizer bar, abrasion may occur and noise may be generated.

Examples of the vibration-damping rubber for a suspension also include a coil spring insulator adapted to be interposed between a coil spring and a spring seat, which is generally composed of a vibration-damping rubber sheet of natural rubber having a ring-like configuration. Vibration-damping rubber sheet is fitted into a ring-shaped groove formed along a periphery of the spring seat, and an end of the coil spring is retained in a concave which is formed in the vibration-damping rubber sheet in a circumferential direction thereof.

To assemble the coil spring insulator thus arranged, it must be positioned between the spring seat and the coil spring. Since the coil spring insulator has a high coefficient of friction, and accordingly low sliding characteristics, conventionally, before assembling, the coil spring insulator has normally been coated with silicone or the like. This increases the number of manufacturing processes. In addition, when the effect of silicone disappears after assembling and the friction resistance increases, noise may be generated due to the slippage of the spring seat and coil spring relative to each other.

Furthermore, since the conventional coil spring insulator is made of a thin sheet material, apparent spring constant increases to lower driving comfort.

In another example of the coil spring insulator, to prevent interference with the coil spring, the coil spring insulator is formed in to a tube-like configuration and a coil spring is retained therewithin. The tube-like coil spring insulator is generally composed of an urethane material, and assembled by cutting the urethane tube open, inserting the coil spring into the cut tube, and closing the cut tube with an adhesive, thus requiring much time and labor for assembly. Furthermore, the coil spring insulator of urethane material has another problem that, when vibrations are input, it cannot give good driving comfort.

SUMMARY OF THE INVENTION

It is an object of the present invention to provide a vibration-damping rubber for a suspension of a vehicle, which enables reduction of sliding friction between a resilient rubber body defining the vibration-damping rubber and members of the suspension of the vehicle, which contacts the resilient rubber body, and enables prevention of the generation of noise or the like.

It is another object of the present invention to provide a stabilizer bushing which enables prevention of the generation of noise and occurrence of lateral slippage without rising of the manufacturing costs caused by the increase of the number of parts, and which enables exhibition of good spring characteristics and durability.

It is still another object of the present invention to provide a coil spring insulator which enables improvement of the work efficiency, prevention of the generation of noise, and improvement of driving comfort.

The vibration-damping rubber for a suspension of a vehicle in accordance with the present invention is composed of a resilient rubber body adapted to be interposed between a plurality of members of the suspension. The resilient rubber body has a slide surface adapted to contact one of the plurality of members. One part of the resilient rubber body, which includes at least the slide surface, is composed of a rubber having high sliding characteristics.

The rubber having high sliding characteristics is preferably composed of a substrate rubber to which higher fatty acid amide is added.

It is preferable that the difference in solubility parameter (SP) between the substrate rubber of the rubber having high sliding characteristics, and the rubber composing the main part of the resilient rubber body is 0.5 or less.

It is also preferable that the difference in solubility parameter (SP) between higher fatty acid amide to be added in the rubber having high sliding characteristics, and the rubber composing the main part of the resilient rubber body is 1.5 or more.

The preferred rubber composing the main part of the resilient rubber body is a rubber having a permeability of $1 \times 10^{-10}$ cm$^3$·cm/cm$^2$·sec·cmHg or less.

Other objects, features, and characteristics of the present invention will become apparent upon consideration of the following description and the appended claims with reference to the accompanying drawings, all of which form a part of this specification.

BRIEF DESCRIPTION OF THE DRAWING

FIG. 4(a) is a cross-sectional view of a stabilizer bushing in a second embodiment of a vibration-damping rubber in accordance with the present invention;

FIG. 4(b) is a longitudinal sectional view of the stabilizer bushing of FIG. 4(a);

FIG. 5(a) is a cross-sectional view of a stabilizer bushing in a third embodiment of a vibration-damping rubber in accordance with the present invention;

FIG. 5(b) is a longitudinal sectional view of the stabilizer bushing of FIG. 5(a);

FIG. 6(a) is a plane view of a stabilizer bushing in a fourth embodiment of a vibration-damping rubber in accordance with the present invention;

FIG. 6(b) is a cross-sectional view of the stabilizer bushing of FIG. 6(a);

FIG. 6(c) is a longitudinal sectional view of the stabilizer bushing of FIG. 6(a);

FIG. 9 is an overall view of a suspension of a vehicle, which includes a coil spring insulator to which the present invention is applied;

FIG. 10(a) is a front view of the coil spring insulator of FIG. 9;

FIG. 10(b) is a sectional view of the coil spring insulator taken along the line A—A of FIG. 10(a);

FIG. 14(a) is a graph showing the measurement results of the amount of oleamide migrated, and the bonding strength;

FIG. 14(b) is a schematic longitudinal sectional view of a test piece;

DETAILED DESCRIPTION OF THE PRESENTLY PREFERRED EXEMPLARY EMBODIMENTS

Hereinafter, several embodiments of the present invention will be explained with reference to the accompanying drawings.

Figure 1:
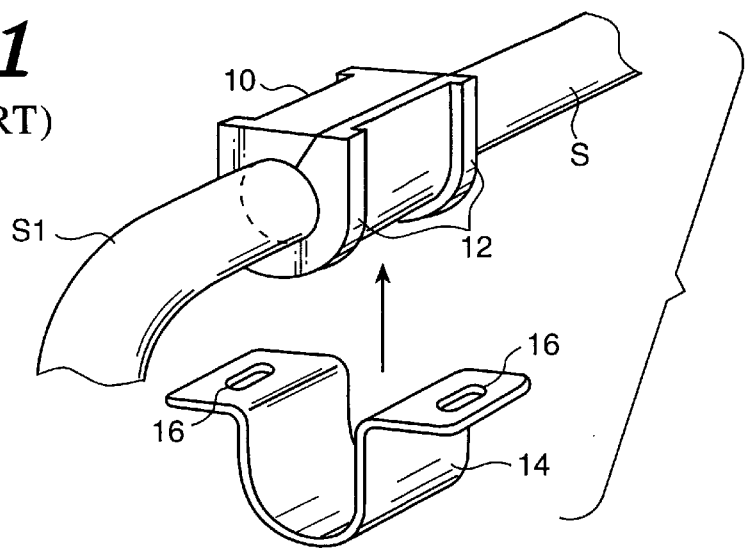
FIG. 1 is a perspective view explaining assembling of a conventional stabilizer bushing to a stabilizer bar.
Figure 2:
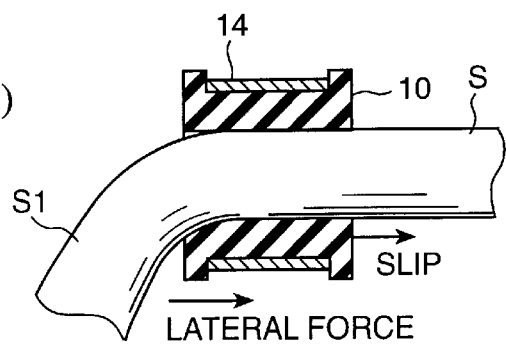
FIG. 2 is a longitudinal sectional view explaining assembling of the conventional stabilizer bushing to a stabilizer bar.
Figure 3A:
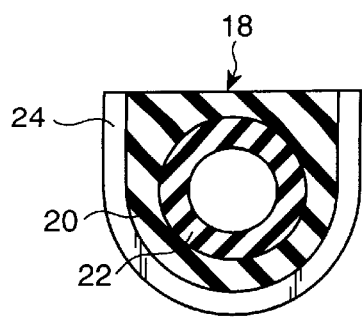
FIG. 3(a) is a cross-sectional view of a stabilizer bushing in a first embodiment of a vibration-damping rubber in accordance with the present invention.
Figure 3B:
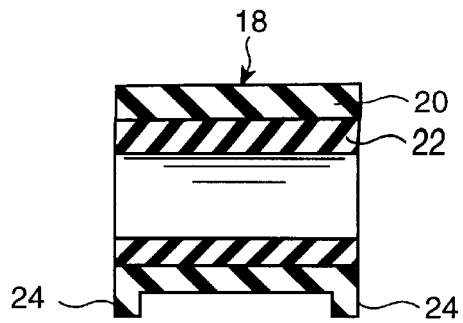
FIG. 3(b) is a longitudinal sectional view of the stabilizer busing of FIG. 3(a)

FIGS. 3(a) and 3(b) illustrate a first embodiment where the present invention is applied to stabilizer bushing. As shown, reference numeral 18 denotes a thick-walled cylindrical resilient rubber body which defines the stabilizer bushing. The resilient rubber body 18 is obtained by inserting a cylindrical inner rubber body 22 which has high sliding characteristics into a cylindrical outer rubber body 20 which acts as a main part of the resilient rubber body 18. An inner surface of the inner rubber body 22 having high sliding characteristics, which is adapted to hold a stabilizer bar (not shown), acts as a slide surface.

The outer rubber body 20 has a flat top surface and is formed into a generally U-shaped cross-section. Axially end edges of the outer rubber body 20 project radially and outwardly to define flanges 24. The outer surface of the outer rubber body 20, which is defined by the flanges 24, is adapted to be retained by a bracket (not shown) having a generally U-shaped cross-section, which is secured to a vehicle frame (not shown) with bolts (not shown).

The outer rubber body 20 can be formed of various kinds of rubber materials generally used for stabilizer bushings, such as natural rubber (NR), butadiene rubber (BR), isoprene rubber (IR), styrene butadiene rubber (SBR), chloroprene rubber (CR), nitrile-butadiene rubber (NBR), ethylene-propylene-diene-copolymer rubber (EPDM), isobutylene-isoprene rubber (IIR), chlorinated isobutylene-isoprene rubber (CL-IIR) and a blend rubber of these rubbers.

The inner rubber body 22 has high sliding characteristics due to the addition of higher fatty acid amide to a substrate rubber thereof. Examples of the substrate rubber of the inner rubber body 22 include natural rubber (NR), butadiene rubber (BR), isoprene rubber (IR), styrene butadiene rubber (SBR), chloroprene rubber (CR), nitrile-butadiene rubber (NBR), ethylene-propylene-diene-copolymer rubber (EPDM), isobutylene-isoprene rubber (IIR), chlorinated isobutylene-isoprene rubber (Cl-IIR), and a blend rubber of these rubbers.

Higher fatty acid amide added to the substrate rubber of the inner rubber body 22 blooms from the substrate rubber during using the inner rubber body 22, thus acting as a lubricant to improve the sliding characteristics of the inner rubber body 22. Examples of the higher fatty acid amide include saturated or unsaturated fatty acid amides having the number of carbon atoms of 12 to 22 such as oleamide, palmitamide, stearamide, erucamide. Normally, the substrate rubber of the inner rubber doy 22 may contain 5 to 20% by weight of higher fatty acid amide. When the content of higher fatty acid amide is less than 5% by weight, the effect of reducing the sliding resistance is difficult to maintain sufficiently. When the content of higher fatty acid amide exceeds 20% by weight, the physical properties as rubber may be affected thereby.

The inner rubber body 22 is formed of the substrate rubber and higher fatty acid amide in a predetermined composition ratio, and may contain well known additives such as vulcanizing agents, accelerators, activators and processing acids. As the vulcanizing agents, 0.1 to 10% by weight of sulfur, peroxide, metal oxide, polyamine or the like may be contained. As the accelerators, 0.1 to 10% by weight of sulfone amide, thiazole, thiuram salts of ditiocarbamate, xanthogenic acid or the like may be contained. As the activators, 3 to 15% by weight of zinc oxide or the like may be contained. As the processing aid, fatty acids such as stearic acid and fatty oil-based fats and fatty oils may be contained.

To manufacture the stabilizer bushing thus arranged, the outer rubber body 20 or inner rubber body 22 having high sliding characteristics is first molded and vulcanized or semi-vulcanized. Then, the remaining rubber body is molded by injecting a rubber material into a mold, and subjected to vulcanization. Alternatively, rubber bodies 20 and 22 may be formed separately into a designed configuration, respectively, and bonded together.

The selection of the materials for both the outer rubber body 20 and inner rubber body 22 is not limited specifically. By selecting them such that the difference in solubility parameter between the substrate rubber of the inner rubber body 22 and the rubber of the outer rubber body 20 is 0.5 or less, the bonding characteristics there between is improved. Normally, when the substrate rubber of the outer rubber body 20 are made of identical or similar rubber materials, approximately the same solubility parameter can be obtained, thus exhibiting good bonding characteristics there between. Alternatively, by selecting rubber materials having similar solubility parameters, similar effects can be obtained.

While using the stabilizer bushing, sliding characteristics are exhibited in the inner rubber body 22 due to blooming of higher fatty acid amide therefrom. In a certain combination of the rubber materials of the rubber bodies 20 and 22, blooming higher fatty acid amide may migrate to the outer rubber body 20. To prevent this migration, it is desirable to select the rubber materials of the outer rubber body 20 and inner rubber body 22 such that the difference in solubility parameter between the rubber of the outer rubber body 20 and the fatty acid amide within the inner rubber body 22 is 1.5 or more, preferably 2 or more.

More specifically, since natural rubber (NR), a blend rubber of natural rubber and butadiene rubber (NR/BR), and chlorinated isobutylene-isoprene rubber (Cl-IIR), for example, have similar solubility parameters as large as about 8, by selecting the substrate rubber of the inner rubber body 22 and the rubber of the outer rubber body 20 from the above rubber materials, and using oleamide having a solubility parameter of about 10 as a higher fatty acid amide, a stabilizer bushing exhibiting excellent bonding characteristics and restraining migration of higher fatty acid amide can be obtained.

When the outer rubber body 20 is composed of rubber materials having low permeability, the migration of the higher fatty acid amide can be further restrained. Rubber materials having permeability of $1 \times 10^{-10}$ cm$^3 \cdot$cm/cm$^2 \cdot$sec$\cdot$cmHg or less, such as isobutylene-isoprene rubber (IIR or Cl-IIR), exhibit remarkable effects especially when used in environments of elevated temperatures.

With the above arrangement, since the inner part of the stabilizer bushing, which is adapted to hold the stabilizer bar, is composed of the rubber having high sliding characteristics, the sliding resistance of the stabilizer bar is reduced, thus enabling prevention of the noise which would be generated when the stabilizer bar displaces greatly, such as when a vehicle starts. Since the outer rubber body 20 of the stabilizer bushing, which contacts the bracket and vehicle body, is composed of a normal rubber material, the friction resistance therebetween is great so that lateral slippage of the stabilizer bushing relative to the bracket, which would occur due to the application of a lateral force, can be prevented. Consequently, no device to stop lateral slippage of the stabilizer bushing is needed, thus enabling reduction of both the number of parts and manufacturing costs, and omission of resin materials, resulting in good spring characteristics and durability.

FIGS. 4(*a*) and 4(*b*) illustrate a second embodiment of the present invention. As shown, a resilient rubber body 26 includes a generally cylindrical rubber body 28 having high sliding characteristics and an upper rubber body 30 having a generally rectangular cross-section, which is positioned on the upper surface of the cylindrical rubber body 28. With the present embodiment, since the lower part of the resilient rubber body 26, which is adapted to be fitted in the bracket, is defined by the rubber body having high sliding characteristics, the friction resistance which would be generated due to assembling of the resilient rubber body 26 and the bracket is reduced, thus improving the assembling characteristics. Furthermore, since the upper part of the resilient rubber body 26, which is adapted to abut the vehicle body, is composed of the rubber body 30 composed of normal rubber materials, the friction resistance between the resilient rubber body 26 and the vehicle body can be increased sufficiently, thus restraining the occurrence of lateral slippage.

As described above, the configurations of the rubber body composed of normal rubber materials, and the rubber body having high sliding characteristics may be modified, as required.

FIGS. 5(*a*) and 5(*b*) illustrate a third embodiment of the present invention. As shown, axially end edges 32 of an inner rubber body 34 which has high sliding characteristics project radially and outwardly to cover axially end faces of an outer rubber body 36. With the present embodiment, since the axially end faces of a thus arranged resilient rubber body 38 are composed of rubber having high sliding characteristics, the occurrence of noise caused by abutting of the stabilizer bar and the axially end faces of the stabilizer bushing can be prevented.

FIGS. 6(a), 6(b) and 6(c) illustrate a fourth embodiment of the present invention. As shown, an inner rubber body 40 having high sliding characteristics has along its outer surface a plurality of projections 42 (in these drawings, two at the respective top and bottom of the inner rubber body 40), each having a T-shaped cross section and being adapted to project into an outer rubber body 44 such that a tip end face thereof is flush with the outer surface of the outer rubber body 44. With the present embodiment, by virtue of the plurality of projections 42, the bonding force of the rubber bodies 40 and 44 is enhanced so that this arrangement is profitable where the substrate rubber of the inner rubber body 40 having high sliding characteristics is not similar to the rubber of the outer rubber body 44.

Figure 7A:
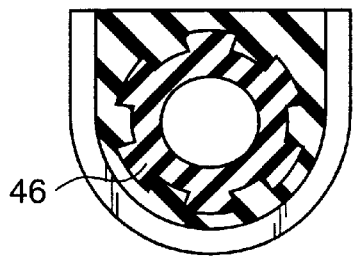
FIG. 7(a) is a cross-sectional view of a stabilizer bushing in a fifth embodiment of a vibration-damping rubber in accordance with the present invention.
Figure 7B:
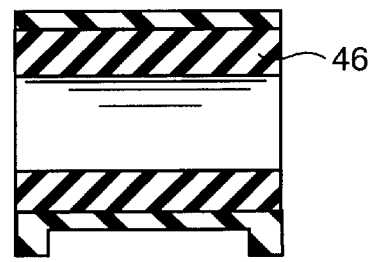
FIG. 7(b) is a longitudinal sectional view of the stabilizer bushing of FIG. 7(a)
Figure 7C:
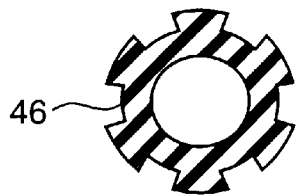
FIG. 7(c) is a modification of a cross-section of a rubber having high sliding characteristics.

FIGS. 7(a), 7(b) and 7(c) illustrate a fifth embodiment of the present invention. As shown in FIG. 7(a), an inner rubber body 46 having high sliding characteristics has a toothed wheel-like cross-section. Each tooth may have a fan-like configuration, as shown in FIG. 7(c). With the present embodiment, effects similar to those of the fourth embodiment can be achieved.

Figure 8A:
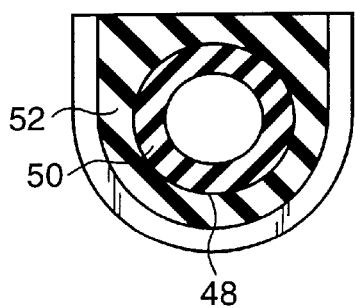
FIG. 8(a) is a cross-sectional view of a stabilizer bushing in a sixth embodiment of a vibration-damping rubber in accordance with the present invention.
Figure 8B:
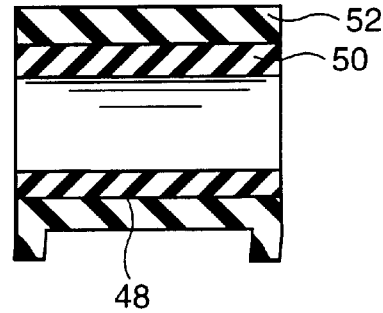
FIG. 8(b) is a longitudinal sectional view of the stabilizer bushing of FIG. 8(a)

FIGS. 8(a) and 8(b) illustrate a sixth embodiment of the present invention. As shown, an outer surface 48 of an inner rubber body 50 having high sliding characteristics is roughened, and then bonded to an outer rubber body 52. With the present embodiment, since the bonding area between the rubber bodies 50 and 52 is increased, the bonding force therebetween can be enhanced.

FIG. 9 illustrates a seventh embodiment where the present invention is applied to a coil spring insulator of a suspension of a vehicle. As shown, the suspension of the vehicle has a shock absorber 54 and a coil spring 56 provided around an upper part of the shock absorber 54. The coil spring 56 is held between spring seats 58 and 60, each being provided around the shock absorber 54.

The spring seats 58 and 60 have circular configurations, and include ring-like grooves 62 and 64 along outer peripheries thereof. Upper and lower end parts of the coil spring 56 are retained in the grooves 62 and 64 through coil spring insulators 66 and 68. In the drawing, reference numeral 70 denotes an upper support which holds an upper end of a rod 72 of the shock absorber 54 to elastically support the suspension by a vehicle body, and reference numeral 74 denotes a cylindrical spring bumper fitted around the rod 72.

The detailed construction of the coil spring insulator 66 which is interposed between the upper end part of the coil spring 56 and the spring seat 58 is illustrated in FIGS. 10(a) and 10(b). As shown, the coil spring insulator 66 includes a ring-shaped rubber member 76 made of a sheet-like resilient rubber body, which has a configuration conforming to that of the groove 62 of the spring seat 58, and a rubber layer 78 having high sliding characteristics, which is placed in contact with an under surface of the rubber member 76. Inner and outer peripheral edges of the respective rubber member 76 and rubber layer 78 are bent to the side of the rubber member 76 to define a circumferentially extending groove 80. An under surface of the rubber layer 78, which is adapted to contact the spring seat 58, acts as a slide surface.

The materials of the rubber member 76 are not limited specifically. Rubber materials similar to those of the outer rubber body 320 of the first embodiment can be used. The preferred material is a natural rubber-based material which is excellent in fatigue resistance.

The preferred materials of the rubber layer 78 having high sliding characteristics are identical to those of the inner rubber body 22 of the first embodiment.

By selecting the rubber materials of the rubber member 76 and rubber layer 78 in accordance with the solubility parameter defined in the first embodiment, effects similar to those of the first embodiment can be effected.

The rubber layer 78 having high sliding characteristics includes three projections 82 which project from the under surface of the rubber member 78 at regular intervals in the circumferential direction thereof. These projections 82 are adapted to be fitted into holes provided in the spring seat 58.

Figure 11:
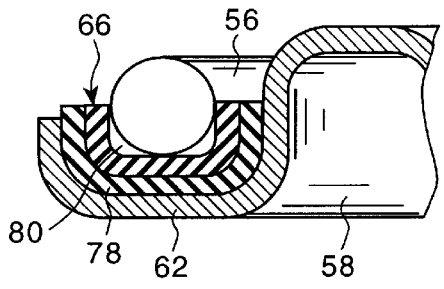
FIG. 11 is a view illustrating the assembling state of a coil spring insulator in a seventh embodiment of a vibration-damping rubber in accordance with the present invention.

To assemble the coil spring insulator 66 in the spring seat 58, as shown in FIG. 11, the coil spring insulator 66 is fitted into the groove 62 of the spring seat 58 such that the projections 82 are fitted in the holes of the spring seat 58, and then, an upper end part of the coil spring 56 is fitted into the groove 80 of the coil spring insulator 66.

Since the rubber layer 78 having high sliding characteristics is provided in the coil spring insulator 66 on the side of the spring seat 58, the friction resistance of the coil spring insulator 66 against the spring seat 58 can be reduced. This results in that when vibrations are input from the coil spring 56, slippage occurs between the coil spring insulator 66 and the spring seat 58 to lower the apparent spring constant, thus improving driving comfort. Furthermore, the positioning operation can be facilitated to improve the work efficiency, and the generation of noise caused by the slippage between metal and rubber can be prevented.

Referring to FIG. 9, the coil spring insulator 68 provided between the lower end part of the coil spring 56 and the spring seat 60 has an arrangement similar to that of the coil spring insulator 66, and can achieve effects similar to those of the coil spring insulator 66 by virtue of the rubber layer having high sliding characteristics.

Where the seat face of the spring seat has inclinations or steps, the coil spring insulator is formed into surface configurations conforming to the seat face of the spring seat. The projections provided in the coil spring insulator are not necessarily required.

Figure 12:
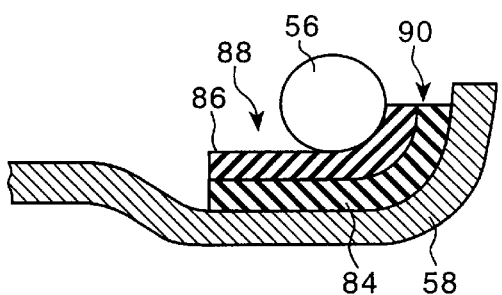
FIG. 12 is a view illustrating the assembling state of a coil spring insulator in an eighth embodiment of a vibration-damping rubber in accordance with the present invention.

FIG. 12 illustrates an eighth embodiment of the present invention. As shown, a sheetlike rubber member 84 is provided on the side of the spring seat 58 while a rubber layer 86 having high sliding characteristics is provided on the side of the coil spring 56. A coil spring insulator 90 thus arranged may have an L-shaped cross-section. With the present embodiment where the rubber layer 86 having high sliding characteristics is provided on the side of the coil spring 56, the friction resistance between the coil spring insulator 90 and coil spring 56 is reduced to improve driving comfort and prevent generation of noise. Furthermore, since the sliding characteristics between the coil spring insulator 90 and coil spring 56 can be ensured, the assembling operation can be facilitated.

Figure 13A:
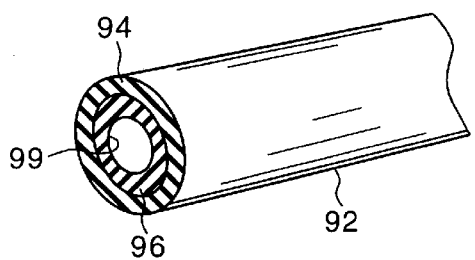
FIG. 13(a) is an enlarged partially sectioned perspective view of a coil spring insulator in a ninth embodiment of a vibration-damping rubber in accordance with the present invention.
Figure 13B:
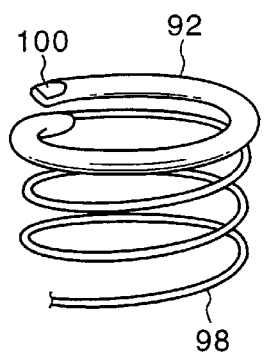
FIG. 13(b) is a view illustrating the assembling state of the coil spring insulator of FIG. 13(a)
Figure 13C:
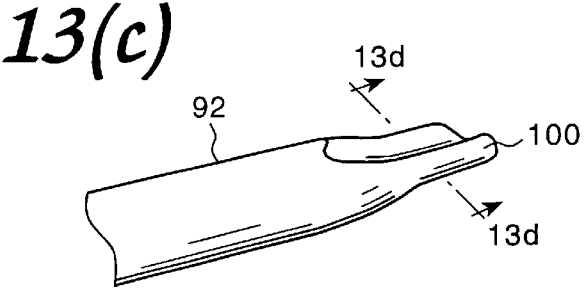
FIG. 13(c) is a partially enlarged view of the coil spring insulator of FIG. 13(a)
Figure 13D:
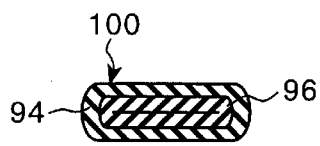
FIG. 13(d) is a cross-sectional view of the coil spring insulator taken along the line B—B of FIG. 13(c)
Figure 13E:
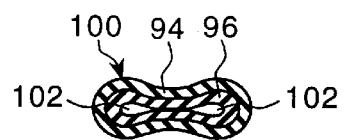
FIG. 13(e) is a modification of an end configuration of the coil spring insulator.

FIGS. 13(a), 13(b), 13(c), 13(d) and 13(e) illustrate a ninth embodiment of the present invention. As shown in FIG. 13(a), a coil spring insulator 92 includes a tube like resilient outer rubber body 94 and an inner rubber layer 96 having high sliding characteristics, which is bonded to an inner surface of the resilient outer rubber body 94. As shown in FIG. 13(b), one end part of a coil spring 98 is inserted into an inner bore of the coil spring insulator 92, which is defined by the inner rubber layer 96 having high sliding characteristics. The outer surface of the outer rubber body 94 is fitted into a ring-like groove provided in a spring seat (not shown). To prevent dropping of the coil spring 98, an end part 100 of the coil spring insulator 92 is crushed into a flat configuration, as shown in FIGS. 13(c) and 13(d). By crushing only the widthwise central part of the coil spring insulator 92 to define air passages 102 on both sides thereof, as shown in FIG. 13(e), the assembling characteristics of the coil spring 98 are enhanced.

With the above arrangement, effects similar to those of the seventh embodiment can be achieved.

Furthermore, since the coil spring insulator 92 is formed into a tube-like configuration to cover the entire periphery of the end part of the coil spring 98, interference between adjacent parts of the coil spring 98 can also be prevented. In addition, by virtue of the inner rubber layer 96 having high sliding characteristics which is provided along an inner surface of the outer rubber body 92, the coil spring 98 can be assembled without cutting the coil spring insulator 92 open, which enables great reduction of the number of parts and manufacturing steps. And the resiliency of the resilient rubber body 92 is increased, as compared to the conventional arrangement using a urethane material, thus improving driving comfort.

The application of the vibration-damping rubber in accordance with the present invention is not limited to the stabilizer bushing and coil spring insulator. It is also applicable to any other vibration-damping rubber used in a suspension of a vehicle.

The relation between the combination of the rubber composing the main part of the resilient rubber body and the rubber having sliding characteristics, migration of higher fatty acid amide, and bonding strength was examined.

As shown in FIG. 14(b), test pieces P, each having a round dumbbell-like configuration, were formed using various rubber materials having compositions (parts by weight) listed in TABLE 1 as the rubber of the main port, and NR/BR rubber containing oleamide as the rubber having high sliding characteristics. A left half 104 of each test piece P is composed of the rubber having high sliding characteristics while a right half 106 is composed of the rubber of the main part. The left half 104 was first molded and then the rubber for the right half 106 was injected and vulcanized.

Each test piece P was kept at 23° C. for 14 days, and the amount of oleamide migrated from the rubber having high sliding characteristics to the rubber of the main part was measured.

The amount of oleamide (% by weight) at three points of the right half 106, which are spaced from the bonding interface with the left half 104 by 3 mm, 6 mm, and 9 mm, respectively, was measured. The measurement results are shown in the amount of oleamide at the point spaced from the bonding interface by 3 mm, Δ denotes the amount of oleamide at the point spaced from the bonding interface by 6 mm and □ denotes the amount of oleamide at the point spaced from the bonding interface by 9 mm.

The bonding strength was measured by subjecting the above test pieces P to a tension test with a tension speed of 50 mm/min. The measurement results are shown together in the graph of FIG. 14(a). In the graph, ● denotes the bonding strength of the test piece vulcanized for 1.5 minutes (time required until the cure meter torque reaches 90%)*[1] and ▲ denotes the bonding strength of the test piece vulcanized for 3 minutes (1.5 times as long as the time required until the cure meter torque reaches 90%) *[2](*1; the volumetric change ΔV was 229%, and *2; the volumetric change ΔV was 225%). For comparison, the bonding strengths of test pieces, each being entirely composed of a single kind of rubber material listed, are also shown as ▼.

TABLE 1

|  | RUBBER OF MAIN PART | | | RUBBER HAVING HIGH SLIDING CHARACTERISTICS |
|---|---|---|---|---|
|  | EPDM | NBR | NR/BR |  |
| EPDM | 100 |  |  |  |
| NBR |  | 100 |  |  |
| NR |  |  |  | 50 |
| BR |  |  | 50 | 50 |
| STEARIC ACID |  |  | 50 | 1 |
| ZINC WHITE | 2 | 2 | 1 | 5 |
| PROCESS OIL | 5 | 5 | 5 | 30 |
| CARBON | 35 | 30 | 30 | 90 |
| BRACK | 100 | 110 | 90 | 3 |
| AGE RESISTOR | 1 | 3 | 3 | 2 |
| SULPHUR | 0.4 | 0.7 | 2 | 2*[5] |
| ACCELERATOR | 3*[3] | 3*[4] | 2*[5] | 6.5 |
| OLEAMIDE | — | — | — |  |
| VULCANIZING TEMPERATURE | 170° C. | 170° C. | 170° C. | 170° C. |
| VULCANIZING TIME (min.) | 5 | 5 | 5 | 5 |

*3: Nocceler M-60P 0.6 parts by weight
Nocceler PX-P 1.2 parts by weight
Vulnoc R-P 1.2 parts by weight
*4: Nocceler TET 2.0 parts by weight
Nocceler TS 1.0 parts by weight
(manufactured by Ouchishinkokagakukogyo, Co., Ltd., brand name)
*5; cyclonexyl benzothiazole sulfenamide As shown in FIG. 14(a), the greater the difference in SP between the rubber of the main part and oleamide (SP: 9.9). the smaller the amount of oleamide migrated. When the difference in SP is 0.8 or more (namely, the rubber of the main part is NBR, NR/BR or EPDM), a remarkable migration-preventing effect can be achieved. Especially when the difference in SP is 2 or more (namely, the rubber of the main part is composed of NR/BR or EPDM), the amount of oleamide migrated becomes approximately zero. And when the rubber of the main part is NR/BR similarly to the substrate rubber of the rubber body having sliding characteristics, the bonding strength is the maximum. This shows that the bonding force can be enhanced by using similar materials as the rubber of the main part and the substrate rubber of the rubber body having high sliding characteristics.

Figure 15A:
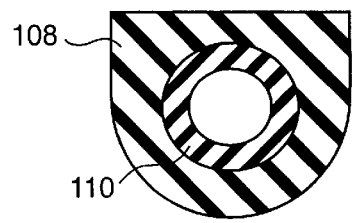
FIG. 15(a) is a schematic cross-sectional view of another test piece.

Next, stabilizer bushings, each having a configuration shown in FIG. 15(a), were formed using IIR rubber having a composition shown in TABLE 2 and NR/BR rubber having the same composition as that shown in TABLE 1 as the rubber of an outer rubber body 108, and NR/BR rubber containing oleamide, which has the same composition as that shown in TABLE 1, as an inner rubber body 110 having high sliding characteristics.

The stabilizer bushings thus arranged were kept at 80° C. for 72 hours, and the amount of oleamide migrated from the inner rubber body 110 having high sliding characteristics to the outer rubber body 108 in a high temperature condition was examined.

Figure 15B:
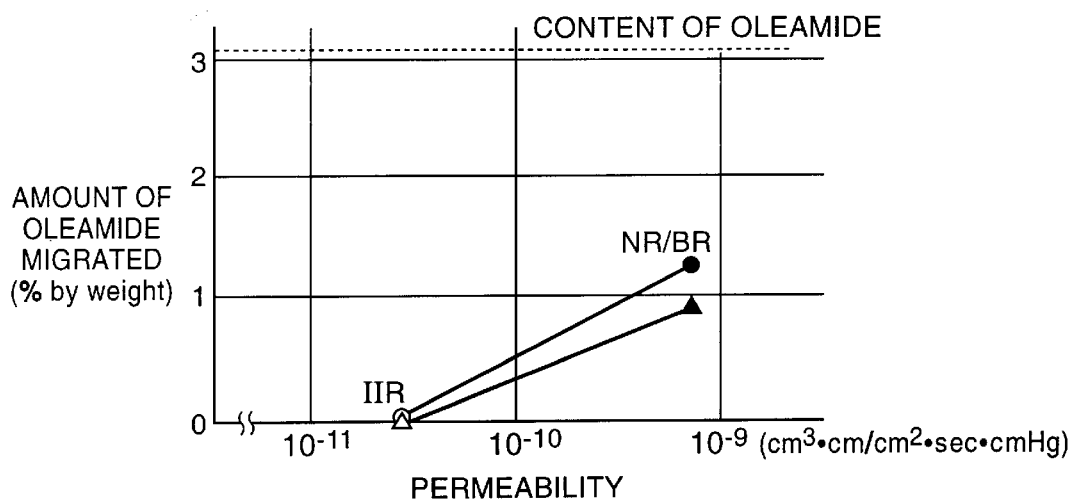
FIG. 15(b) is a graph showing the relation between the permeability and the amount of oleamide migrated.

The amount of oleamide (% by weight) at the points of each outer rubber body 108, which are spaced from the bonding interface with the inner rubber body 110 having high sliding characteristics by 3 mm and 6 mm, was measured. The measurement results are shown in the graph of FIG. 15(b). The permeability was measured using nitrogen gas at an atmospheric temperature of 25° C. In the graph, ○ and Δ show the results of IIR rubber while ● and ▲ show the results of NR/BR rubber. And each of ○, ● shows the amount of oleamide at the point spaced from the bonding interface by 3 mm and each of Δ, ▲ shows the amount of oleamide at the point spaced from the bonding interface by 6 mm.

TABLE 2

| RUBBER OF MAIN PART | | RUBBER HAVING HIGH SLIDING CHARACTERISTICS |
|---|---|---|
| IIR | 100 | |
| NR | | 50 |
| BR | | 50 |
| STEARIC ACID | 2 | 1 |
| ZINC WHITE | 5 | 5 |
| PROCESS OIL | 30 | 30 |
| CARBON BRACK | 70 | 90 |
| AGE RESISTOR | 1 | 3 |
| SULFUR | 1 | 2 |
| ACCELERATOR | 7*6 | 2*5 |
| OLEAMIDE | — | 6.5 |
| VULCANIZING TEMPERATURE | 170° C. | 170° C. |
| VULCANIZING TIME(min.) | 5 | 3 |

*5; cyclohexyl benzothiazole sulfenamide
*6; Nocceler ITCU 4.0 parts by weight
Nocceler TT 2.0 parts by weight
Nocceler DM 1.0 parts by weight
(manufactured by Ouchishinkokagakukogyo, Co., Ltd. Brand name)

As shown in FIG. 15(b), where IIR rubber was used as the rubber of the outer rubber body 108, the amount of oleamide migrated was approximately zero. This shows that the migration hardly occurred at elevated temperatures. Where NR/BR rubber was used as the rubber of the outer rubber body 108, at a normal temperature, the migration was hardly observed, as shown in FIG. 14(a), but at elevated temperatures, the amount of oleamide migrated increased. This shows that where there is the possibility of using the stabilizer bushing at elevated temperatures, it is desirable to compose it of a rubber material having low permeability. The preferred rubber material is that having permeability of $1 \times 10^{-10}$ cm$^3$·cm/cm$^2$·sec·cmHg or less Upon measuring the bonding strength of IIR rubber in a manner similar to that in the preceding measurement, good bonding strength as high as 550 N/cm$^2$ was observed.

Figure 16:
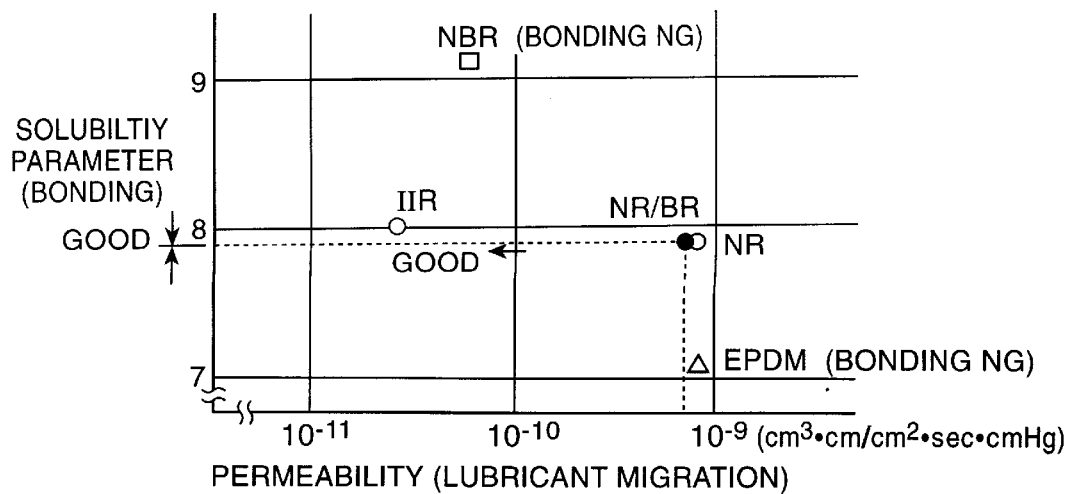
FIG. 16 is a graph showing the relation between the permeability and the solubility parameter (SP) of various kinds of rubber materials.

FIG. 16 shows the relation between the permeability and SP or various rubber materials. As shown, where the substrate rubber of the rubber body 110 having high sliding characteristics is NR/BR rubber, for example, to enhance the bonding characteristics between the rubber bodies 108 and 110, it is preferable to compose the outer rubber body 108 of NR rubber, NR/BR rubber and IIR rubber, each having a solubility parameter (SP) similar to that of NR/BR rubber. NBR rubber and EPDM rubber are less preferable because the difference in SP was great. To prevent the migration of the higher fatty acid amide as a lubricant, it is preferable to use IIR rubber or NBR rubber because of lower permeability, as compared with other rubber materials. These results show that where IIR rubber is used as the rubber of the outer rubber body 108, both the improvement in bonding characteristics and prevention of migration of higher fatty acid amide at elevated temperatures can be effected.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A vibration-damping element comprising:
    a resilient rubber body interposed between a plurality of members included in a vehicle suspension,
    said resilient rubber body having a main rubber body bonded to a rubber layer,
    said rubber layer having a reduced sliding resistance slide surface in contact with one of the plurality of members, and said rubber layer containing a higher fatty acid amide component,
    a first difference in solubility parameter between said rubber layer and said main rubber body being 0.5 or less, and a second difference in solubility parameter between said higher fatty acid amide component and said main rubber body being 1.5 or more.

2. A vibration-damping element as claimed in claim 1, wherein said main rubber body has a permeability of $1 \times 10^{-10}$ cm$^3$·cm/cm$^2$·sec·cmHg or less.

3. A vibration-damping element as claimed in claim 1, wherein said main rubber body and said rubber layer are bonded by vulcanization.

4. A vibration-damping element as claimed in claim 1, wherein said rubber layer contains a substrate rubber in addition to said higher fatty acid amide component, and wherein the first difference in solubility parameter between said substrate rubber of said rubber layer and a rubber of said main rubber body is 0.5 or less.

5. A stabilizer bushing comprising:
    a cylindrical resilient rubber body adapted to receive a stabilizer bar of a vehicle suspension,
    said cylindrical resilient rubber body having an outer surface adapted to be held by a bracket secured to a vehicle body, and an inner surface adapted to contact the stabilizer bar, said inner surface acting as a slide surface,
    said cylindrical resilient rubber body being composed of a cylindrical outer rubber body bonded to a cylindrical inner rubber body,
    said cylindrical inner rubber body having high sliding characteristics and containing a higher fatty acid amide component,
    a first difference in solubility parameter between said cylindrical inner rubber body and said cylindrical outer rubber body being 0.5 or less, and a second difference in solubility parameter between said higher fatty acid amide component and said cylindrical outer rubber body being 1.5 or more.

6. A stabilizer bushing as claimed in claim 5, wherein axially end edges of said cylindrical inner rubber body project radially outwardly to cover axially end faces of said cylindrical outer rubber body.

7. A stabilizer bushing as claimed in claim 5, wherein said cylindrical outer rubber body and said cylindrical inner rubber body are bonded by vulcanization.

8. A stabilizer bushing as claimed in claim 5, wherein said cylindrical inner rubber body contains a substrate rubber in addition to said higher fatty acid amide component, and wherein the first difference in solubility parameter between said substrate rubber of said cylindrical inner rubber body and a rubber of said cylindrical outer rubber body is 0.5 or less.

9. A coil spring insulator comprising:
    a resilient rubber body interposed between a coil spring of a vehicle suspension and a spring seat supporting the coil spring, a surface of said resilient rubber body being adapted to contact the spring seat and acting as a slide surface;

said resilient rubber body comprising a main rubber body bonded to a rubber layer having high sliding characteristics, said rubber layer defining said slide surface, and said rubber layer containing a higher fatty acid amide component, a first difference in solubility parameter between said rubber layer and said main rubber body being 0.5 or less and a second difference in solubility parameter between said higher fatty acid amide component and said main rubber body being 1.5 or more.

10. A coil spring insulator as claimed in claim 9, wherein said main rubber body and said rubber layer are bonded by vulcanization.

11. A coil spring insulator as claimed in claim 9, wherein said rubber layer contains a substrate rubber in addition to said higher fatty acid amide component, and wherein the first difference in solubility parameter between said substrate rubber of said rubber layer and a rubber of said main rubber body is 0.5 or less.

12. A vibration-damping element comprising:

a main body and a rubber layer bonded to said main body, said rubber layer containing a higher fatty acid amide component; and a first difference in solubility parameter between said rubber layer and said main rubber body being 0.5 or less, and a second difference in solubility parameter between said higher fatty acid amide component and said main rubber body being 1.5 or more.

* * * * *